2,813,894
PREPARATION OF γ DIHYDROIONONE

Max Stoll, Petit-Lancy, Switzerland, assignor to Firmenich & Co., successeurs de la société anonyme M. Naef & Cie, a corporation of Switzerland No Drawing. Application April 12, 1954,
Serial No. 422,685

9 Claims. (Cl. 260—488)

The optically active γ-dihydroionone is a constituent of natural ambergris. L. Ruzicka et al. (Helvetica Chimica Acta, vol XXXI, pages 829–830 (1948)) on the one hand and E. Lederer et al. (Helvetica Chicima Acta, vol. XXIX, page 1363 (1946) on the other, separated this compound from natural ambergris or from the oxidation products of ambreine by means of the Girard ketone reagent. The so prepared γ-dihydroionone had the following physical constants:

Ruzicka:
$d_4^{21} = 0.9373$
$n_D^{21} = 1.4730$

Lederer:
$d = 0.9495$
$n_D^{20} = 1.4860$

Both scientists prepared from this compound a semicarbazone melting at 188–189° C. (Lederer) and 189–190° C. (Ruzicka). Hydrolysis of this semicarbazone gave Ruzicka et al. a ketone with the physical constants: $d_4^{22} = 0.9347$; $n_D^{22} = 1.4789$, which only slightly differs from those indicated above. This ketone was said to have a typical amber-like scent. From the recovered γ-dihydroionone they prepared a phenylsemicarbazone, melting at 120–121° C. and a 2,4-dinitrophenylhydrazone, melting at 98–99° C. (Helvetica Chimica Acta, vol. XXXI, page 830).

The synthesis of the racemic γ-dihydroionone has been first performed by L. Ruzicka, G. Büchi and O. Jeger (Helvetica Chimica Acta, XXXI, page 293 (1948)). Starting from α-dihydroionone in ether solution, HCl was added to the molecule and the obtained hydrochloride was treated with silver stearate in xylol; 19,400 mg. of the starting α-dihydroionone gave 350 mg. (1.8%) of an impure semicarbazone of γ-dihydroionone melting at 176–180° C. Ruzicka et al. mentioned that nearly half of the starting α-dihydroionone was recovered.

A careful study of this synthesis showed that this last assumption was not correct. Hydrochloric acid has a deep action on α-dihydroionone and destroys a great part of the starting material which is thus lost, and consequently the yield of γ-dihydroionone is very low.

Now I have found that the yield of this latter compound can be increased at least 16 times when α-dihydroionol is used as the starting material instead of the corresponding ketone, and this alcohol is transformed into its acetate either before or during the adjunction of hydrochloric acid. The preparation of the hydrochloride of α-dihydroionone acetate (Formula I) is carried out in acetic acid solution. According to the process for the preparation of γ-dihydroionone of the present invention, the hydrochloride of Formula I is then heated with a neutral alkali metal salt (instead of a silver salt) of one or more weak organic acids or with an alkali metal alcoholate in an inert solvent. This forms a mixture of α, β and γ-dihydroionol-acetates (Formula II). Cold saponification of these acetates and oxidation of the obtained alcohols (Formula III) with chromic acids to a crude mixture of α, β and γ-dihydroionones (Formula IV). This mixture can be used either for separating the pure γ-dihydroionones by means of a reagent for ketones, or directly as raw material for the preparation of 1,1,6-trimethyl-6-hydroxy-octaline according to the copending application Serial No. 422,686, filed of even date herewith, now abandoned.

The new process of the invention corresponds to the following equations:

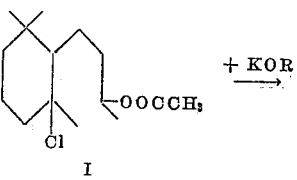

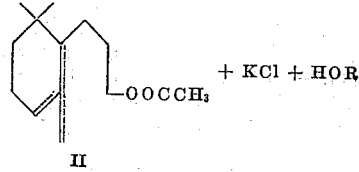

(R=—CH₃ or CH₃(CH₂)ₓCO— or (CH₃)₃C—)

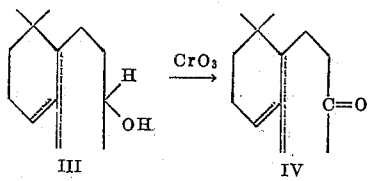

The elimination of hydrochloric acid is accomplished best with a dry neutral or slightly acid salt of potassium laurate in boiling xylene. Another good procedure consists in heating the hydrochloride with a mixture of dry sodium methylate and xylene eventually mixed with lauric acid.

During the saponification, fairly strong acids such as HCl, H₂SO₄ and strong bases should be avoided. The saponification of the mixture of α, γ, β-dihydroionolacetates must be carried out at low temperature. The same precaution applies during the oxidation with chromic acid. The resulting mixture of α and γ-dihydroionones (and eventually also β-dihydroionone) contains up to 60% and more γ-isomer. The rest of the product consists of the α isomer, the dihydroionol isomers (10 to 20%) and some unidentified byproducts. The alcohols are returned to the oxidation reaction and the recovered α-dihydroionone to the preparation of the hydrochloride. The high γ isomer content of the final product allows its separation from the other compounds by a simple crystallization of its semicarbazone, without chromatographic procedures, which is a great simplification with respect to the procedure of Ruzicka et al. γ-Dihydroionone is a raw material for perfume compositions and the starting material for the preparation of new compounds and compositions of matter, according to my copending application Serial No. 422,686. The crude mixture of isomeric dihydroionones α, β and γ can also be used directly for the cyclisation of the γ isomer into 1,1,6-trimethyl-hydroxy - 1,2,3,4,5,6,7,8 - octahydronaphthalene and 1,1,6-trimethyl-hydroxy- 1,2,3,5,6,7,8,8 - octahydronaphthalene according to my copending application Serial No. 422,686.

The following description exemplifies how the starting material of the invention process may be prepared and how said process may be performed.

(a) *Preparation of α dihydroionol acetate*

600 g. of α dihydroionol are dissolved into 900 g.

acetic anhydride and mixed with 150 g. dry potassium acetate. This mechanically stirred mixture is refluxed for three hours. After cooling it is poured into 1.5 litres of water and warmed on a steam bath for 30 minutes. Shaking from time to time helps to complete the reaction. The reaction mixture is then extracted with ether. The ether solution is washed with carbonate and water, and then dried over anhydrous sodium sulfate. The distillation of the ether leaves a residue of 725 g. which is α dihydroionol acetate, corresponding to a yield of 99%.

1 g. of this residue requires 233 to 237 mg. KOH for saponification; calculated 235 mg.

(b) *Preparation of the 3-chloro-tetrahydroionol acetate (Formula I)*

750 g. α dihydroionol acetate are dissolved in 2900 g. acetic acid and cooled to 14° C. A rapid stream of gaseous hydrochloric acid is passed into the solution for 2 hours. After this period, the solution is super-saturated with HCl. This supersaturation is maintained for 20 hours by continuous introduction of HCl. The reaction mixture is then poured on ice and extracted with ether. The ether solution is washed with water, carbonate and again with water. The ether is removed very cautiously by distillation especially towards the end of the distillation. Yield is 97.5% on the theory of crude 3-chloro-tetrahydroionol acetate $C_{15}H_{27}O_2Cl$ (Formula I). Cl calculated: 12.9%; found: 12.4%.

It is also possible to effect the acetylation and the adjunction of hydrochloric acid in a single operation, using acetic acid as solvent.

(c) *Preparation of γ dihydroionol (Formula III)*

830 g. of 3-chloro-tetrahydroionol acetate (hydrochloride of α dihydroionol acetate) are dissolved in a slowly stirred mixture of 1500 g. of dry potassium laurate in 2100 ml. of dry xylene. Alkali salts of other similar organic acids, e. g. undecylenic, abietic, stearic, benzoic, or phthalic acid are also suitable as reagent. Instead of potassium laurate it is also possible to use dry sodium or potassium methylate or tertiary butylate mixed with a higher aliphatic acid. Instead of xylene, tertiary butyl alcohol may be used. It is of importance that the potassium salt is not alkaline but preferably slightly acidic. The reaction flask is heated in an oil bath to about 148–155° C. for two hours (temperature measured in the oil bath). Then the temperature is raised to 170–175° C. and a portion of the solvent is distilled off. The reaction mixture is then filtered. The filter and remaining salts on the filter are thoroughly washed with ether or xylene. The ether or xylene solution is then washed with carbonate and water and dried over anhydrous potassium sulfate. After the solvent has been removed, the remaining oil is distilled in a Claisen flask under 0.15 mm. Hg pressure. One obtains a main fraction of 645 g. of dihydroionolacetate (Formula II) distilling between 96°–100° C. and 6 g. of a higher boiling fraction between 108–120° C. The main fraction, which is practically free of chlorine, is dissolved at ordinary temperature in 6500 ml. of ethanol, containing 235 g. of KOH. After having been in contact with the alkali solution for 15 hours at ordinary temperature, the solution is exactly neutralized with normal hydrochloric acid, about 600–800 ml. N.HCl. The ethanol is removed by distillation and the remaining oil is dissolved in ether. The ether solution is then washed with water. Care is taken to maintain the neutrality strictly after the ether has been dried and distilled; the mixture of dihydro-α and γ-ionols (Formula III) which may perhaps contain a small quantity of β isomer is rectified under 0.2 mm. Hg pressure.

B. P. 89–95° C. under 0.2 mm. Hg  
B. P. 100–102° C. under 0.35 mm. Hg } 517 g.  
$d_4^{27.4}=0.9143$; $n_D^{26.9}=1.481$ If the dehydrochlorination is carried out in alcoholic solution, saponification and isomerisation occurs, but yields less γ isomer.

This product contains up to 50% and more γ dihydroionol.

(d) *Preparation of γ dihydroionone (Formula IV)*

150 g. of the above product are dissolved in a mixture of 1500 g. acetic acid, 1000 ml. benzene and 225 ml. water containing 36 g. potassium bisulfate. This mixture is stirred and cooled inside to +6° C. Outside the temperature is maintained at +1° C. To this cooled mixture is then added a solution of 135 g. chromic acid ($CrO_3$) in 75 ml. water diluted with 1500 g. acetic acid. The introduction speed is so regulated as to maintain the temperature in the flask below +7° C., which takes about one hour and 20 minutes. The stirring is continued for about 25 minutes. Then the reaction mixture is poured into ice water and the oil is extracted twice with benzene. The extract is washed with water, carbonate and again with water. The benzene solution is dried, and the benzene is removed by distillation and the remaining oil rectified in a Vigreux column under 0.12 mm. Hg pressure. A fraction of 118.6 g. distils between 77° and 85° C.; yield 79%.

$d_4^{20}=0.926$; $n_D^{20.5}=1.479$

Oximation shows 80.5% of ketone with a γ isomer content of about 67±5%. 114 g. of this fraction gave 110 g. of semicarbazone with alcoholic semicarbazide acetate solution. The unreacted portion (29 g.) goes back to the oxidation. The melting point of the crude semicarbazone is about 177–180° C. By a series of crystallizations, first in methanol and later in chloroform, the γ isomer can be separated from the other isomers. The semicarbazone of the γ dihydroionone is only slightly soluble in methanol (2.4 g. in 100 ml.). Its melting point is 195° C.; it varies according to the heating time necessary for its ascertainment. The total yield is about 80 g. semicarbazone or 62 g. ketone. About 40 g. pure semicarbazone can be separated by fractional crystallization, corresponding to 31 g. ketone (Formula IV). Yield 36.6%. The remaining mixture (23 g.) of unseparated semicarbazones of α and γ dihydroionones is hydrolyzed and is recycled for treatment with HCl, as described in paragraph (b) above. This increases the yield to 50%. The overall yield of γ dihydroionone semicarbazone starting from α dihydroionone is 30% of the theoretical value.

The hydrolysis of the semicarbazone is carried out in the usual way by steam distillation with a solution of tartric acid followed by a treatment with Girard's reagent, along the usual lines to separate small amounts of byproducts formed during the hydrolysis. The pure γ dihydroionone has the following physical constants:

B. P. 70° C. under 0.02 mm. Hg; $d_4^{20}=0.918$; $n_D^{20}=1.476$

Its odour is not typically amberlike. It is therefore different from the natural product described by Lederer and Ruzicka and which contained probably other ketonic byproducts with an amberlike smell.

Instead of separating the γ ketone by means of a ketone reagent, it is also possible to separate first the mixture of the non-oxidized ionols by heating it with a boric ester and distilling off the non-reacting ketonic fraction, which is then submitted to a fractional distillation in a Podbielniak column. But if one wants to cyclise the γ-ketone according to the copending application Serial No. 422,686, the crude mixture of the non-fractionated ketones may be used. This crude mixture has the following average physical constants:

B. P. 85° C. under 0.1 mm. Hg; $d_4^{24}=0.920$; $n_D^{24}=1.475$ and titrates about 95% of ketones (oximation).

Instead of steam distillation, the hydrolysis of the semicarbazone (2 g.) may be carried out by boiling $CCl_3H$ (50 ml.) under a layer of 3 g. phthalic anhydride in 20 ml. water for two hours. After filtration, washing to neutrality and distillation, 1.45 g. γ ketone is obtained having:

B. P. 110–112° C. under 8 mm. Hg; $d_4^{21}=0.916$; $n_D^{21}=1.475$

What I claim is:
1. 3 chloro tetrahydroionol acetate.
2. Process for preparing an isomeric mixture of dihydroionones containing large quantities of gamma dihydroionone, comprising reacting an alpha dihydroionol lower alkanoic acid ester with a slightly acidic compound of an alkali metal selected from the group consisting of alcoholates and salts of a weak organic acid by heating a suspension of the mixture in an inert solvent, saponifying the residual acetates of the isomeric dihydroionols, and then oxidizing the mixture of isomeric dihydroionols with chromic acid to obtain a mixture of gamma dihydroionone with at least one of its isomers.
3. The process as defined in claim 2, wherein hydrochloric acid is removed from dihydroionol acetate hydrochloride by reaction with a slightly acidic potassium salt of a lower monohydroxy alkanol.
4. The process as defined in claim 2, wherein hydrochloric acid is removed from dihydroionol acetate hydrochloride by reaction with a slightly acidic alkali metal salt of a higher aliphatic acid.
5. The process as defined in claim 2, wherein hydrochloric acid is removed from dihydroionol acetate hydrochloride by reaction with an alkali metal salt of a weak organic acid comprising a higher aliphatic acid.
6. The process of preparing gamma dihydroionone comprising reacting the starting materials by the procedure as defined in claim 2, and separating gamma dihydroionone from the mixture by fractional crystallization of its semicarbazone.
7. The process of preparing gamma dihydroionone comprising reacting the starting materials by the procedure as defined in claim 2, and separating gamma dihydroionone from the mixture by fractional crystallization of its Girard's ketone derivative.
8. The process of preparing gamma dihydroionone comprising reacting the starting materials by the procedure as defined in claim 2, and separating gamma dihydroionone from the mixture by fractional crystallization of its dimethyl-N-glycide-hydrazone.
9. The process of preparing gamma dihydroionone comprising reacting the starting materials by the procedure as defined in claim 2, and separating gamma dihydroionone from the mixture by fractional distillation.

References Cited in the file of this patent
UNITED STATES PATENTS 2,675,393    Naves _____ Apr. 13, 1954

FOREIGN PATENTS 666,106    Great Britain _____ Feb. 6, 1952

OTHER REFERENCES

Ruzicka et al.: Helv. Chim. Acta, vol. 31 (1948), pp. 293–5.

Prelog et al.: Helv. Chim. Acta, vol. 36 (1953), pp. 1640–8.